United States Patent [19]

Zona

[11] Patent Number: 4,833,789
[45] Date of Patent: May 30, 1989

[54] COORDINATE-MEASURING MACHINE

[75] Inventor: Mauro Zona, Turin, Italy

[73] Assignee: D.E.A. Digital Electronic Automation S.p.A., Moncalieri, Italy

[21] Appl. No.: 54,513

[22] Filed: May 27, 1987

[30] Foreign Application Priority Data

May 27, 1986 [IT] Italy .................. 67436 A/86

[51] Int. Cl.⁴ .............................. G01B 5/03
[52] U.S. Cl. ..................... 33/503; 33/1 M; 33/572
[58] Field of Search ............. 33/1 M, 503, 504, 572, 33/169 R

[56] References Cited

U.S. PATENT DOCUMENTS 4,240,205 12/1980 Tuss ........................ 33/1 M
4,483,079 11/1984 Band et al. ................ 33/503
4,630,381 12/1986 Sakata et al. ............. 33/503
4,651,439 3/1987 Band et al. ................ 33/503

Primary Examiner—William A. Cuchlinski, Jr.
Assistant Examiner—Patrick R. Scanlon
Attorney, Agent, or Firm—Shlesinger & Myers

[57] ABSTRACT

The machine substantially comprises a support element of tubular form within the interior of which a column is axially movable in a first direction, a first carriage movable in a second direction orthogonal to the first and to which the said support element is pivoted to allow rotation about an axis parallel to the second direction, and an arm one end of which is fixed to the column and the axis of which is disposed in a third direction, orthogonal to the other two; the machine further includes a second carriage movable on the arm in the third direction, which is provided with attachment means for a bar to which is fixed a feeler device.

14 Claims, 2 Drawing Sheets

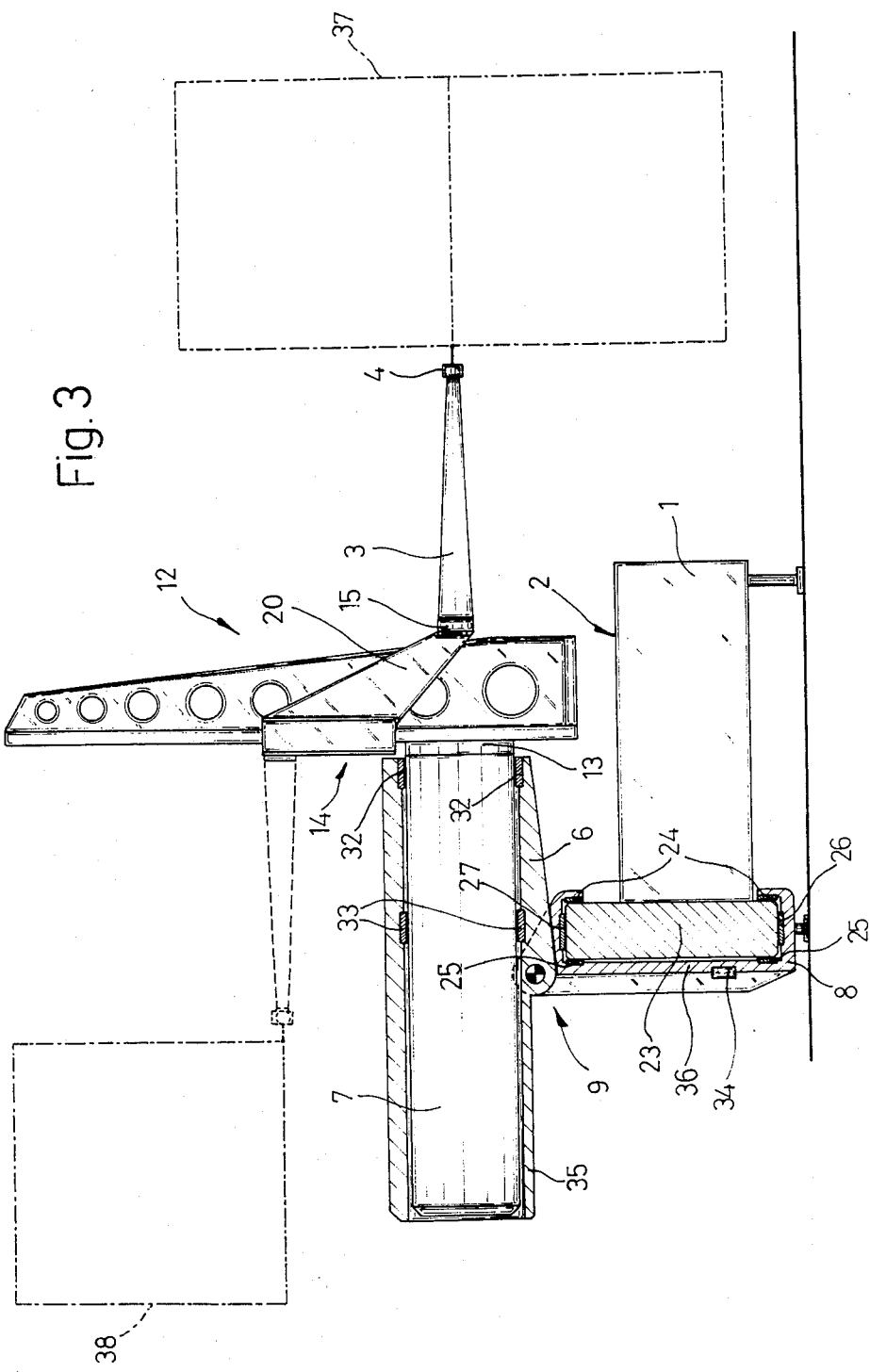

COORDINATE-MEASURING MACHINE

BACKGROUND OF THE INVENTION

The present invention relates to a coordinate-measuring machine, comprising a base for supporting a workpiece or a mechanical assembly to be measured, and a bar which is adapted to support a feeler device arranged to be carried into contact with the surfaces of the workpiece and which is movable with respect to the base along the three directions of a set of three orthogonal axes.

To support this bar and to allow it to be displaced in the three directions defined above, supporting structures of substantially two different types are utilized.

In a first structure the bar is fixed to a first carriage axially movable in a first vertical direction on a second carriage which, in turn, is movable in a second direction orthogonal to the first on a beam which forms part of a portal with a substantially U-shape form supported by the base of the machine. This portal is movable in a third horizontal direction orthogonal to the others, on suitable guides of the base.

In the other structure the bar is fixed to a carriage movable in a first horizontal direction on an arm, which is also horizontal, and in turn movable in a second vertical direction orthogonal to the first on a column supported by the base. This latter is movable on guides of the base in a third horizontal direction orthogonal to the above two.

In machines of the type briefly described there are various disadvantages.

First of all, the measurement precision is not very high nor constant in all working configurations of the machine; this disadvantage is due to the static deformations which are generated in some parts of the structure by the effect of the rather high loads which act on them and which are due to the weight of some of these movable parts, such as the carriages which support the bar to which the feeler device is fixed. The line of action of the resultant due to the weight of these movable parts is normally eccentric with respect to the mid-plane of the main support elements of the machine, such as the portal or the column, and therefore not only forces but also moments are applied to these: consequently some parts of the structure are stressed under flexion and torsion and experience deformations which considerably limit the precision of measurement obtainable with the machine.

Moreover, other measurement inaccuracies consequent on deformations of some parts of the structure are caused by the inertia forces which are generated during movements of the carriages or arm of the machine; such forces are particularly high because of the high mass of these members.

Thus, the mass of the movable parts of the machine being rather high, the accelerations of the parts themselves during their displacement must be maintained low in order to avoid transmitting high inertia forces to the supporting structure of the machine: consequently rather long displacement times are required to carry the feeler device from one working position to another.

Finally, the supporting structure of the machine described does not allow any variations in the configuration to adapt the machine to different working conditions: in fact, the feeler device can move only within a predetermined volume which is located above the support surface of the base of the machine, and which has rather small dimensions. Each machine, therefore, is only able to effect workshop measurements during the course of which the feeler device is carried solely in contact with the surface of a workpiece or mechanical assembly which has been positioned on the base of the machine. These machines cannot be adapted for use other than for this function, or for the testing of mechanical units on a production line, or mechanical units disposed on a support plane different from that of the base of the machine, or on mechanical units having very large dimensions.

SUMMARY OF THE INVENTION

The object of the present invention is that of providing a coordinate measuring machine of the type indicated which will be free from the disadvantages which have been described and, therefore, which allows measurement with a very high precision to be effected in any working position of the feeler device and with which it is possible to effect measurement on a mechanical assembly disposed on the base of the machine or on a mechanical assembly which moves along a working line or which is disposed on the same support plane on which the machine itself rests.

These objects are achieved by means of a coordinate measurement machine comprising a base for supporting a workpiece or mechanical assembly to be measured and a bar operable to support a feeler device which can be carried in contact with the surfaces of the said workpiece, the said bar being movable with respect to the said base along the three directions of a set of three orthogonal axes, characterised by the fact that it comprises a support element of tubular form within which a column is axially movable in a first of the said directions; a first carriage movable with respect to the said base in a second of the said directions, and to which the said support element is pivoted by means of pivots operable to allow a rotation thereof substantially through 90° about an axis parallel to the said second direction; an arm one end of which is fixed to one end of the said column and the axis of which is disposed in a third of the said directions; a second carriage movable on the said arm in the said third direction, the said second carriage being provided with attachment means for the said bar; and actuating means operable to control the displacements of the said column, the said first and second carriage respectively in the said first, second and third directions and for controlling the rotation of the said support element about the said axis and the said machine being able to be carried, by means of rotation through 90° of the said support element about the said axis, from a first configuration in which the axis of the said column is vertical and the said arm is horizontal, to a second configuration in which the axis of the said column is horizontal and the said arm is vertical.

BRIEF DESCRIPTION OF THE DRAWINGS

For a better understanding of the measurement machine of the present invention a more detailed description of it will now be given by way of example with reference to the attached drawings, in which:

FIG. 3 shows another schematic side view of the machine in a second working configuration.

DETAILED DESCRIPTION OF THE INVENTION

Figure 2:
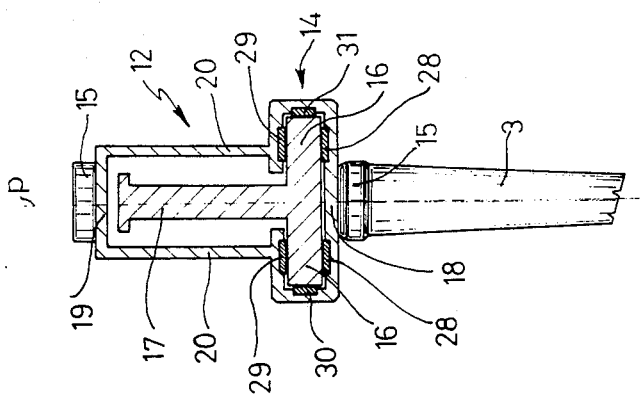
FIG. 2 shows, on an enlarged scale with respect to that of the preceding Figure, a section of the machine taken on the line II—II.

The machine of the invention comprises a base 1 on the upper surface 2 of which can be supported a workpiece or a mechanical assembly (not shown) to be measured, and a bar 3 which can support a feeler device 4 provided to be carried into contact with the surfaces of the workpiece; the said bar is movable with respect to the base 1 along the three directions of a set of three orthogonal axes and can be displaced within a volume of substantially parallelepiped form defined by the broken line 5.

The machine comprises a support element 6 of tubular form within which a column 7 is axially movable in a first vertical direction. A first carriage 8 is movable with respect to the base 1 in a second direction orthogonal to the first and the support element 6 is pivoted to it by pivot means 9 which are able to allow a rotation thereof substantially through 90° about an axis parallel to the second direction defined above to carry this support element from a first configuration, shown in FIG. 1, to a second configuration, shown in FIG. 3.

The machine further comprises an arm 12 the axis of which is disposed in a third direction orthogonal to the two preceding directions and one end of which is fixed to the upper end of the column 7. Conveniently, but not necessarily, between the said two ends are disposed other pivot means 13 able to allow the rotation of the arm 12 about an axis parallel to the previously defined first direction and substantially coincident with the vertical axis of the column 7.

The machine includes a second carriage 14 movable on the arm 12 in the previously-defined third direction: it is provided with fixing means 15 for the bar 3 operable to maintain the longitudinal axis of this parallel to the previously defined first direction.

There are also provided actuating means, not shown, operable to control the displacements of the column 7, the first and second carriage 8 and 14 respectively in the said first, second and third direction and to control the rotation of the support element 6 about the axis of the pivot means 9: if there are provided pivot means 13 operable to allow the rotation of the arm 12 about the axis of the column 7, the machine also includes actuating means for controlling the said rotation.

As is clearly seen in FIG. 2, the arm 12 is symmetrical with respect to a vertical plane indicated P in FIG. 2, and the column 7 is substantially cylindrical: the axis of this latter is contained in the plane P. The second carriage 14 is also symmetrical with respect to the plane P as is seen in FIG. 2. For the purpose of obtaining the said symmetry the arm 12 has a substantially T-shape cross-section with a pair of horizontal fins 16 and a central core 17 orthogonal to these. The second carriage 14 has, in section, a substantially C-shape form as in seen in FIG. 2, and is guided by the fins 16 in its longitudinal displacement with respect to the arm 12; this carriage is provided with a first attachment plate 18 to which are connected the fixing means 15 of the bar 3 and which is located beneath the arm 12 and a second attachment plate 19 is located above the arm itself and this, too, is provided with fixing means 15 for the bar 3 and conveniently is connected to two sides 20 which form with it a portal element connected in turn to the second carriage 14. The first carriage 8 is movable in the previously defined second direction on a guide plate 23 fixed to the base 1 and also has, in section, a substantially C-shape form as is clearly seen in FIGS. 1 and 3; conveniently to provide a very precise guide for this carriage, and to allow relative movements between this and the guide plate 23 with very low friction there are conveniently provided two first and two second pairs of pneumatically supported shoes, respectively 24 and 25, disposed respectively on two parallel and opposite surfaces, as well as a third and a fourth pair of pneumatically supported shoes, respectively 26 and 27, respectively disposed on a third and a fourth surface orthogonal to the first and second. The said shoes are disposed opposite corresponding surfaces of the guide plate 23 for the purpose of pneumatically supporting the carriage with respect to the plate itself during displacement in the previously-defined second direction.

Similarly, for the guidance of the second carriage 14 there are conveniently provided at least two first and second pairs of pneumatically supported shoes, respectively 28 and 29, which are disposed on corresponding parallel surfaces of the carriage itself; a third and a fourth pair of pneumatically supported shoes, respectively 30 and 31, are disposed on surfaces orthogonal to the above. These shoes are positioned opposite corresponding surfaces of the fins 16 of the arm 12 to support the second carriage 14 pneumatically with respect to the arm during displacement of the first with respect to the second along the previously-defined third direction.

For guidance of the column 7 during its displacement, relative to the support element 6 there are provided two series of pneumatically supported shoes 32 and 33 cooperating with corresponding surfaces of the column in such a way as pneumatically to support this latter with respect to the support element; conveniently the distance between the two series of shoes 32 and 33, measured in the direction of the axis of the column 7, is greater than one third of the free length of the arm 12.

According to the invention, the second carriage 14, the second plate 19 and the two sides 20 fixed to the carriage itself, as well as the arm 12, are made of a material having a specific gravity less than that of the column 7, the support element 6 and the first carriage 8; conveniently, for the construction of these parts there is chosen a material the specific gravity of which is sufficiently low to make the centre of gravity of the assembly constituted by the arm 12, the second carriage 14 and the other parts connected to this lie on a vertical line which falls within the support element 6; preferably this material is a carbon fibre.

Figure 1:
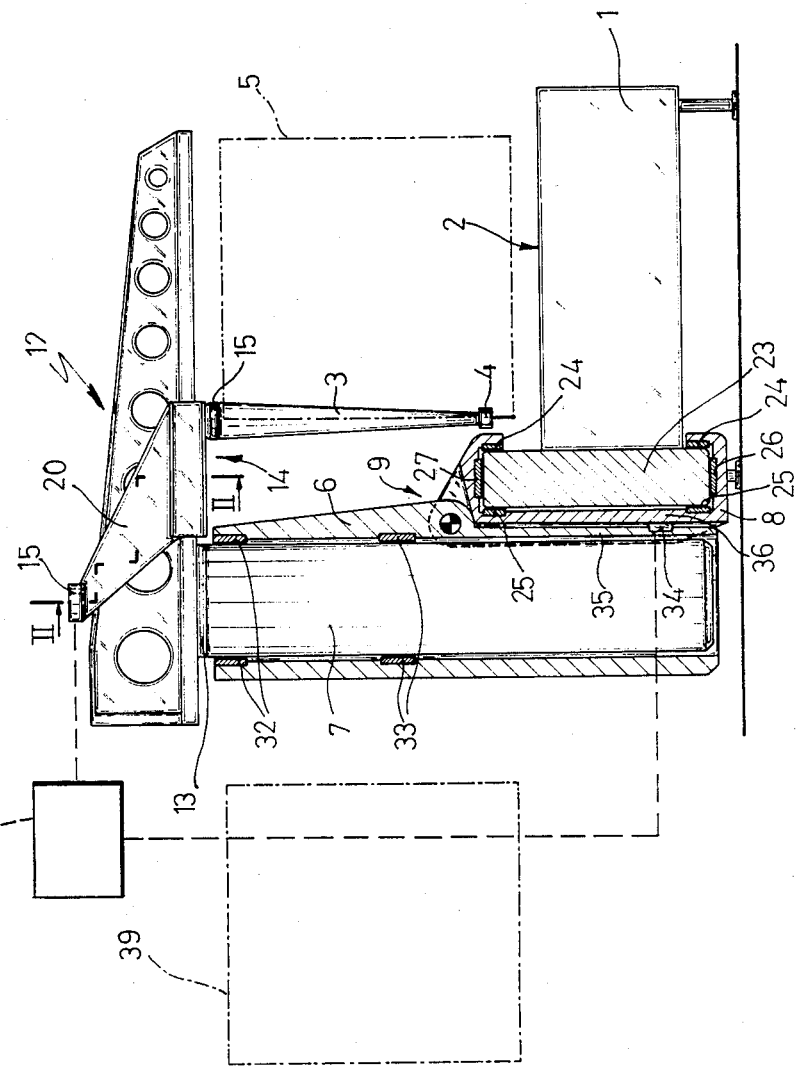
FIG. 1 is a schematic, partially sectioned side view of the measurement machine of the invention in a first working configuration.

The machine further includes an adjustment device for automatically adjusting the angular position of the support element 6 with respect to the first carriage 8 when the machine is located in the configuration of FIG. 1 for the purpose of compensating the displacements of the end of the arm 3 due to elastic deformations of the arm 12 during displacement of the second carriage 14 with respect to the arm itself.

This adjustment device, which in FIG. 1 has been indicated generally with the reference numeral 34, comprises actuating means of any suitable type operable to cause the support element to rotate with respect to the carriage, constituted, for example, by a screw-and-nut arrangement the elements of which are supported one from a wall 35 and the other from a wall 36 of the support element 6 and the carriage 8 respectively; the device further includes sensor means 40 for detecting the position of the second carriage 14 on the arm 12, operable to generate an electrical signal indicative of this position to activate the actuating means for a time dependent on the detected position.

The operation and behaviour of the machine described is, in use, as follows. When the machine is in the first configuration shown in FIG. 1 in which the axis of the column 7 is vertical, it is arranged to effect measurement within the volume 5 above the base 1: in this configuration the machine is therefore predisposed to effect normal workshop measurements. Displacements of the second carriage 14 with respect to the arm 12, of the column 7 with respect to the support element 6 and of this latter with respect to the guide plate 23 can be effected with very low friction because of the pneumatic support obtained with the soes 24, 25, 26, 27, 28, 29, 30, 31, 32 and 33. In particular, the substantially C-shape form of the cross-section of the carriages 8 and 14 and the disposition of the associated shoes allows an extremely precise guidance; the same result is obtained for the guidance of the column 7 with respect to the support element 6 by means of the two series of shoes 32 and 33: because of the considerable distance between the shoes of the two series forces of a very reduced value act perpendicular to the axis of the column 7 on each series of shoes: this favourable result is obtained also because of the extremely low weight of the assembly constituted by the carriage 14, the parts associated with it and the arm 12 and because of the small distance between the line of action of the resultant of the weight of this assembly from the axis of the column 7. Because of the small value of the forces exchanged between the shoes 32, 33 and the surface of the column 7 the guidance provided by the shoes themselves is extremely precise.

The measurement precision obtainable with the machine is very high because of the very low value of the deformations of all the parts of the structure: the arm 12, because of the form of its section, clearly visible in FIG. 2, has a high rigidity against flexure; moreover, the weight of the carriage 14 and of the parts associated with it is very low and therefore the flexural deformations of the arm itself due to this weight can be considerably reduced. The deformations of the assembly constituted by the column 7 and the support element 6 are also entirely negligible because of the form of these elements, having a very high rigidity. Moreover since both the arm 12 and the carriage 14 and the parts associated with it are prefectly symmetrical with respect to the vertical plane P, and since the axis of the column 7 is also disposed in this plane, the resultant of the forces applied by the carriage 14 and the parts associated with it to the arm 12, and the forces transmitted from this latter to the column 7 and to the support element 6 are contained in the previously-defined plane, with the advantage of avoiding the generation of moments which would tend to stress the arm 12 under torsion and stress the column assembly 7 and the support element 6 under flexure.

Moreover, because of the extremely low mass of the carriage 14, due both to the form of this and to the material of which it is made, the inertia forces which occur during its displacement are also very low: consequently, these displacements can be controlled at a rather high displacement speed.

The machine can also be carried into the configuration represented in FIG. 3, obtained by means of a rotation through substantially 90° of the support element 6 with respect to the slide 8 and a rotation of 180° of the arm 12 about the axis of the column 7; in this configuration, whilst still allowing the three fundamental displacements of the feeler device 4 along the previously-defined three orthogonal directions, this latter is carried to a working position adapted to measure a workpiece or a mechanical assembly within a volume 37 disposed laterally of the base 1; this volume can be that of a mechanical assembly which moves along a production line and therefore the machine, in this configuration, is adapted to take measurements directly on such a production line. To equip the machine to effect the said measurements the bar 3 is disconnected from the associated fixing means 15 of the first attachment plate 18 and connected to the fixing means 15 of the second attachment plate 19 which is located on the opposite side of the arm 12.

If, on the other hand, this bar is fixedly anchored to the first attachment plate 18, the machine is able to effect measurement on a workpiece or a mechanical assembly contained within a volume 38 which is located on the other side of the base 1 and at a certain height with respect thereto.

Finally, if, starting from this configuration of FIG. 1, the arm 12 were made to turn through 180° about the vertical axis of the column 7, it is possible to perform measurements within a volume 39 which is located, with respect to the column 7, on the opposite side from that in which the volume 5 is located; obviously the mechanical assembly lying in the volume 39 can be supported by any suitable equipment.

It is evident that the form and arrangement of the various parts of the machine which has been described can have modifications and variations introduced thereto without departing from the ambit of the invention. In particular, an embodiment can be envisaged in which the base 1 is omitted; in this case the mechanical unit on which the measurements are to be effected can be supported directly on the support plane on which the machine itself rests.

The arm 12 can also have a different structure from that which has been shown and described: in particular it can have a different section, for example a double T.

Finally, a different structure can be envisaged for the pivot means 9 which allow the rotation of the support element 6 with respect to the carriage 8 about an axis parallel to the previously-defined second direction; this pivot means can in fact be modified in an entirely obvious way in order also to allow rotations of the support element 6 about a vertical axis parallel to the previously-defined first direction; with this constructional arrangement it is possible to obtain configurations such as those of FIG. 3 in which, however, the axis of the bar 3 is oriented in any direction contained in the horizontal plane in which this axis lies in FIG. 3.

I claim:

1. A coordinate measuring machine, comprising a base (1) for supporting a workpiece or a mechanical assembly to be measured, and a bar (3) for supporting a feeler device (4) which can be carried into contact with the surfaces of the said workpiece, the said bar being movable with respect to the said base along the three directions of a set of three orthogonal axes, characterised by the fact that said machine comprises a support element (6) of tubular form within the interior of which a column (7) is axially movable in a first of the said directions; a first carriage (8) movable with respect to the said base in a second of the said directions and to which the said support element is pivoted by pivot means (9) operable to allow a rotation thereof through substantially 90° about a first axis parallel to the said second direction; an arm (12) one end of which is fixed to one end of the said column and the axis of which is disposed in a third of the said directions; a second carriage (14) movable on the said arm in the said third direction, the said second carriage being provided with attachment means (15) for the said bar; and the said machine being movable, by means of a rotation through 90° of the said support element about the said first axis, from a first configuration in which the axis of the said column is vertical and the said arm is horizontal, to a second configuration in which the axis of the said column is horizontal and the said arm is vertical.

2. A machine according to claim 1, characterized by the fact that the said end of the said arm is pivoted to the said column with pivot means (13) able to allow a rotation thereof through substantially 180° about a second axis parallel to the said first direction.

3. A machine according to claim 1, characterized by the fact that the said arm is symmetrical with respect to a first vertical plane and the said column is substantially cylindrical, the axis of the said column being contained in the said first plane.

4. A machine according to claim 1, characterized by the fact that the said second carriage is symmetrical with respect to the said first vertical plane.

5. A machine according to claim 1, characterized by the fact that the said arm and the said second carriage are made from a material having a specific gravity less than that of the said column, support element and first carriage.

6. A machine according to claim 5, characterised by the fact that the specific gravity of the said material is chosen in such a way that the centre of gravity of the assembly constituted by the said arm, the said second carriage and the said bar is located on a vertical line which falls within the said support element.

7. A machine according to claim 1, characterised by the fact that the said material is a carbon fibre.

8. A machine according to claim 1, characterized by the fact that said machine includes a guide plate (23) fixed to said base to constitute a guide for said first carriage, said first carriage having at least two first pairs (24) and two second pairs (25) of pneumatically supported shoes disposed respectively on first and second coplanar surfaces and a third surface parallel to said coplanar surfaces, and a third (26) and a fourth (27) pair of pneumatically supported shoes disposed respectively on a fourth and a fifth surface orthogonal to said first, second and third surfaces, said shoes being disposed opposite corresponding surfaces of said guide plate, said shoes pneumatically support said first carriage with respect to said plate during displacement in said second direction.

9. A machine according to claim 1, characterized by the fact that the said support element is provided with two series of pneumatically supported shoes (32, 33) cooperating with corresponding surfaces of the said column, said shoes pneumatically support the said column with respect to the said support element during the displacement of the said column in the said first direction, the distance between the said two series of shoes, measured in the said first direction, being greater than $\frac{1}{3}$ of the free length of the said arm.

10. A machine according to claim 1, characterised by the fact that the said arm has a substantially T-shape section with a pair of fins (16) and a central core (17) orthogonal to the said fins, the said second carriage being supported by the said fins.

11. A machine according to claim 10, characterized by the fact that said second carriage has at least two first pairs (28) and two second pairs (29) of pneumatically supported shoes disposed respectively on first and second coplanar surfaces and a third surface parallel to said coplanar surfaces, and a third (30) and a fourth (31) pair of pneumatically supported shoes disposed respectively on a fourth and a fifth surface orthogonal to said first, second and third surfaces, said shoes being disposed opposite corresponding surfaces of said fins, said shoes pneumatically support said second carriage with respect to said arm during displacement thereof in said third direction.

12. A machine according to claim 1, characterised by the fact that the said second carriage has a first (18) and a second (19) attachment plate for the said bar which, when the said machine is located in the said first configuration are disposed respectively beneath and above the said arm, the said second plate forming part of a portal element (20) fixed to the said second carriage.

13. A machine according to claim 1, characterised by the fact that it includes an adjustment device (34) for automatically adjusting the angular position of the said support element with respect to the said first carriage when the said machine is located in the said first configuration for the purpose of compensating displacements of the end of the said arm due to elastic deformations of the said arm during displacement of the said second carriage on the said arm.

14. A machine according to claim 13, characterised by the fact that the said adjustment device includes sensor means for detecting the position of the said second carriage on the said arm and operable to generate an electrical signal indicative of the said position to activate the said adjustment device for a time dependent on the said detected position.

* * * * *